United States Patent [19]

Ohkubo et al.

[11] Patent Number: 4,845,417
[45] Date of Patent: Jul. 4, 1989

[54] DRIVER FOR STEPPING MOTOR

[75] Inventors: Toshiki Ohkubo, Tokyo; Hitoshi Kimura, Gumna, both of Japan

[73] Assignee: NEC Corporation, Japan

[21] Appl. No.: 114,768

[22] Filed: Oct. 30, 1987

[30] Foreign Application Priority Data

Oct. 31, 1986 [JP] Japan ................................. 61-261048

[51] Int. Cl.4 ..................... ............. H02P 8/05
[52] U.S. Cl. .................................. 318/696; 318/685
[58] Field of Search ............................. 318/696, 685

[56] References Cited

U.S. PATENT DOCUMENTS 4,661,755 4/1987 Suzuki ................... 318/696

Primary Examiner—William M. Shoop, Jr.
Assistant Examiner—Saul M. Bergmann
Attorney, Agent, or Firm—Ostrolenk, Faber, Gerb & Soffen

[57] ABSTRACT

A driver circuit for a stepping motor includes first and second windings for two-phase magnetization to give a magnetomotive force to the stepping motor. A first control signal and a second control signal are generated by a control circuit when the stepping motor seeks and is held respectively. The first and second windings are connected in series or in parallel with a power supply in response to the first control signal or the second control signal, respectively. The directions of the currents flowing through the first and second windings are controlled in response to the control signals. The connections of the windings and the current flow directions through the windings are controlled by MOS transistors.

9 Claims, 4 Drawing Sheets

| STATE | D | F1Q | F2Q | G1 | G2 | G3 | G4 | PH11 | PH21 | PH31 | PH41 |
|---|---|---|---|---|---|---|---|---|---|---|---|
| ① | L | L | L | L | H | L | L | H | L | L | H |
| ② | L | L | H | H | L | H | H | H | H | L | L |
| ③ | L | H | L | H | L | H | H | L | H | H | L |
| ④ | L | H | H | L | H | L | L | L | L | H | H |
| ⑤ | H | L | L | L | H | L | H | H | L | L | H |
| ⑥ | H | L | H | H | L | H | L | H | H | L | L |
| ⑦ | H | H | L | H | L | H | L | L | H | H | L |
| ⑧ | H | H | H | L | H | L | H | L | L | H | H |

4,845,417

DRIVER FOR STEPPING MOTOR

BACKGROUND OF THE INVENTION

The present invention relates to a driver for a stepping motor and, more particularly, to a driver circuit which is effective for use in a floppy disk apparatus.

In a floppy disk apparatus a stepping motor is used to move (seek) a head in the radial direction of the disk. There have been various types of stepping motor drivers, such as the three-phase Variable Reluctance (VR) type, four-phase Permanent Magnet (PM) type, four-phase hybrid type and five-phase hybrid type. The four-phase hybrid type is generally used.

The four-phase hybrid type stepping motor has four or two windings. The former type (four windings) stepping motor is rotationally driven by suitably selecting the winding direction and arrangement of the respective windings to make the magnetomotive forces (or magnetic field directions) of the respective windings different by 90 degrees and to sequentially vary the magnetizing order of the windings. In the latter type (two windings), the four magnetic field directions having a phase difference of 90 degrees are equivalently realized by varying the directions of currents flowing through the two windings which are arranged in electrically spaced positions of 90 degrees.

FIG. 1 shows an example of a driver circuit for use with two windings $W_A$ and $W_B$ according to the prior art. The directions of the currents flowing through the windings $W_A$ and $W_B$ are varied by controlling switching transistors $TR_1$ to $TR_8$. The driver circuit shown in FIG. 1 is usually called the "H-bridge".

In the floppy disk device, the stepping motor causes the magnetic head to seek the radial position of the disk in response to a step pulse and determines the seeking direction in response to a direction signal. As the magnetizing method of the windings there have been utilized one-phase magnetization for magnetizing one winding and two-phase magnetization for concurrently magnetizing two windings. The one-phase magnetization may obtain higher accuracy in stopping position whereas the two-phase magnetization may obtain larger drive torque. In order to attain the larger drive torque, the two-phase magnetization is usually used.

The floppy disk device has two states—the seeking state in which the magnetic head is caused to seek the radial position of the disk and the holding state in which the magnetic head is held in a predetermined position. It is the usual practice to feed a larger current for the seeking operation and a smaller current for the holding operation. This is because the torques necessary are different for the seeking and holding operations (that is, the larger torque is required for the former), whereby the calorific power is desirably dropped so as to avoid the thermal expansion of the Mylar used as the base of the disk medium, and the load upon the host power supply is desirably reduced.

The switching of the currents for the seeking and holding operations is effected by adopting either the two-power supply method or the resistor insertion method in the prior art. FIG. 1 shows the two-power supply method, in which the windings $W_A$ and $V_B$ are supplied with power of +12V, when a switching transistor $TR_0$ is "ON", and at +5V, when the same is "OFF", via a diode $D_1$ through transistors $TR_1$-$TR_8$.

FIG. 2 is a circuit diagram showing the resistor insertion method, in which a voltage of +5 V is applied to the windings when the switching transistor $TR_0$ is "ON" whereas a lower, voltage that by the voltage drop of a resistor $R_1$, than +5V is applied to the windings when the same is "OFF". FIG. 3 is a circuit diagram showing another example, in which resistors $R_2$ and $R_3$ are connected in series with the windings $W_A$ and $W_B$ and are short-circuited, if necessary, by switches $SW_1$ and $SW_2$.

The circuit of FIG. 2 is utilized because the number of its parts is fewer than that of the circuit of FIG. 3. In the resistor insertion method, however, the voltage to be applied to the H-bridge (especially, the transistors $TR_1$, $TR_3$, $TR_5$ and $TR_7$) will drop in accordance with the voltage drop due to the resistor $R_1$ which will make the bias of the PNP and NPN series transistors unreliable and insufficient and cause oscillating phenomena. With a view to compensating the delay of the base currents of the transistors, therefore, a capacitor C of high capacitance is inserted, as shown.

However, the aforementioned two-power supply method requires two kinds of power supplies which complicates the device and prevents size reduction. In the resistor insertion type method, on the other hand, the resistor inserted causes unnecessary power consumption and calorific power and prevents integration of the circuit. The requirement of a large value such as an electrolytic capacitor makes it impossible to realize the integration of the circuit and causes problems as to reliability, i.e., working life.

SUMMARY OF THE INVENTION

It is, therefore, an object of the present invention to provide a driver for a stepping motor capable of providing a necessary torque with a low power consumption.

Another object of the present invention is to provide a stepping motor driver with a small calorific power suitable for integration.

According to the present invention, there is provided a driver for a stepping motor, comprising: a first circuit including first and second switch circuits one ends of which are connected with one end of a first winding, and third and fourth switch circuits one ends of which are connected with another end of the first winding, another ends of the first and third switch circuits and another ends of the second and fourth switch circuits being connected commonly with each other; a second circuit including fifth and sixth switch circuits one ends of which are connected with one end of a second winding which is associated with the first winding for imparting a magnetomotive force to the stepping motor, and seventh and eighth switch circuits one ends of which are connected with another end of the second winding, another ends of the fifth and seventh switch circuits and another ends of the sixth and eighth switch circuits being connected commonly with each other; a diode connected between the another ends of the fourth and fifth switch circuits; a ninth switch circuit connected between the another end of the fourth switch circuit and a reference potential; a tenth circuit connected between a power supply and the another end of the fifth switch circuit; a first control circuit for generating a first control signal to turn on or off said first to eighth switch circuits thereby to control the directions of the currents flowing through the first and second windings; and a second control circuit for generating a second control signal to turn on or off the ninth and tenth switch circuits thereby to connect the first and second windings in series or in parallel.

Other objects and features of the present invention will be clarified from the following explanation with reference to the drawings.

BRIEF DESCRIPTION OF THE INVENTION

DESCRIPTION OF THE PREFERRED EMBODIMENTS

Figure 1:
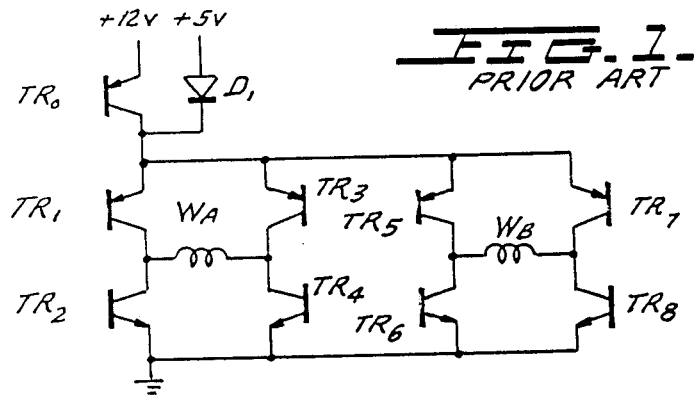
FIG. 1 is a conventional circuit diagram of a two-power supply type driver for a stepping motor.
Figure 2:
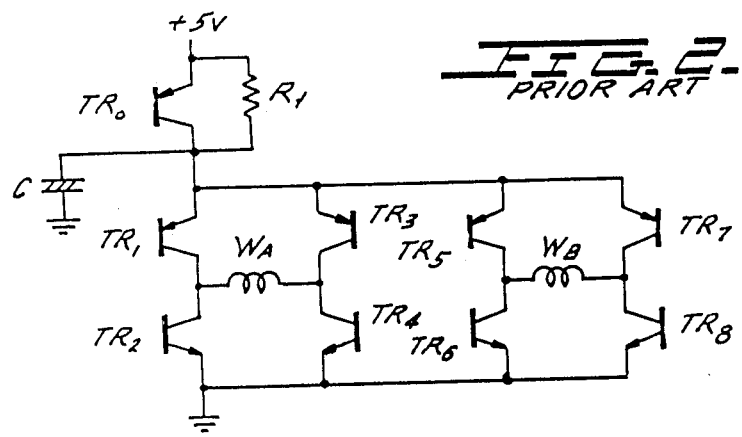
FIGS. 2 and 3 are conventional circuit diagrams of resistor insertion type drivers for a stepping motor.
Figure 3:
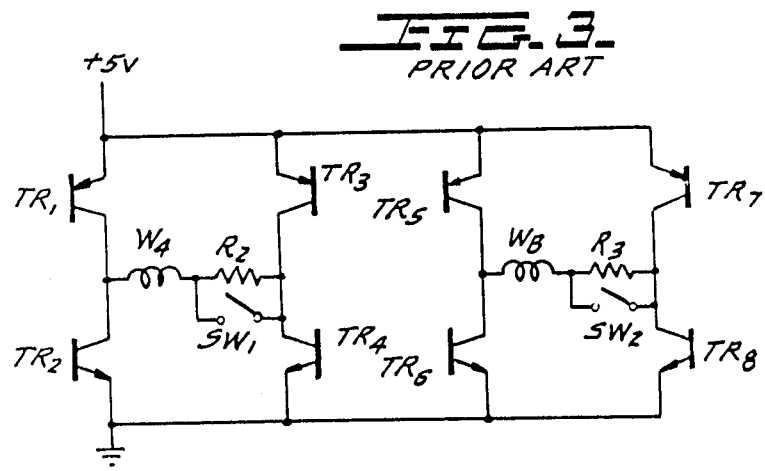
Figure 4:
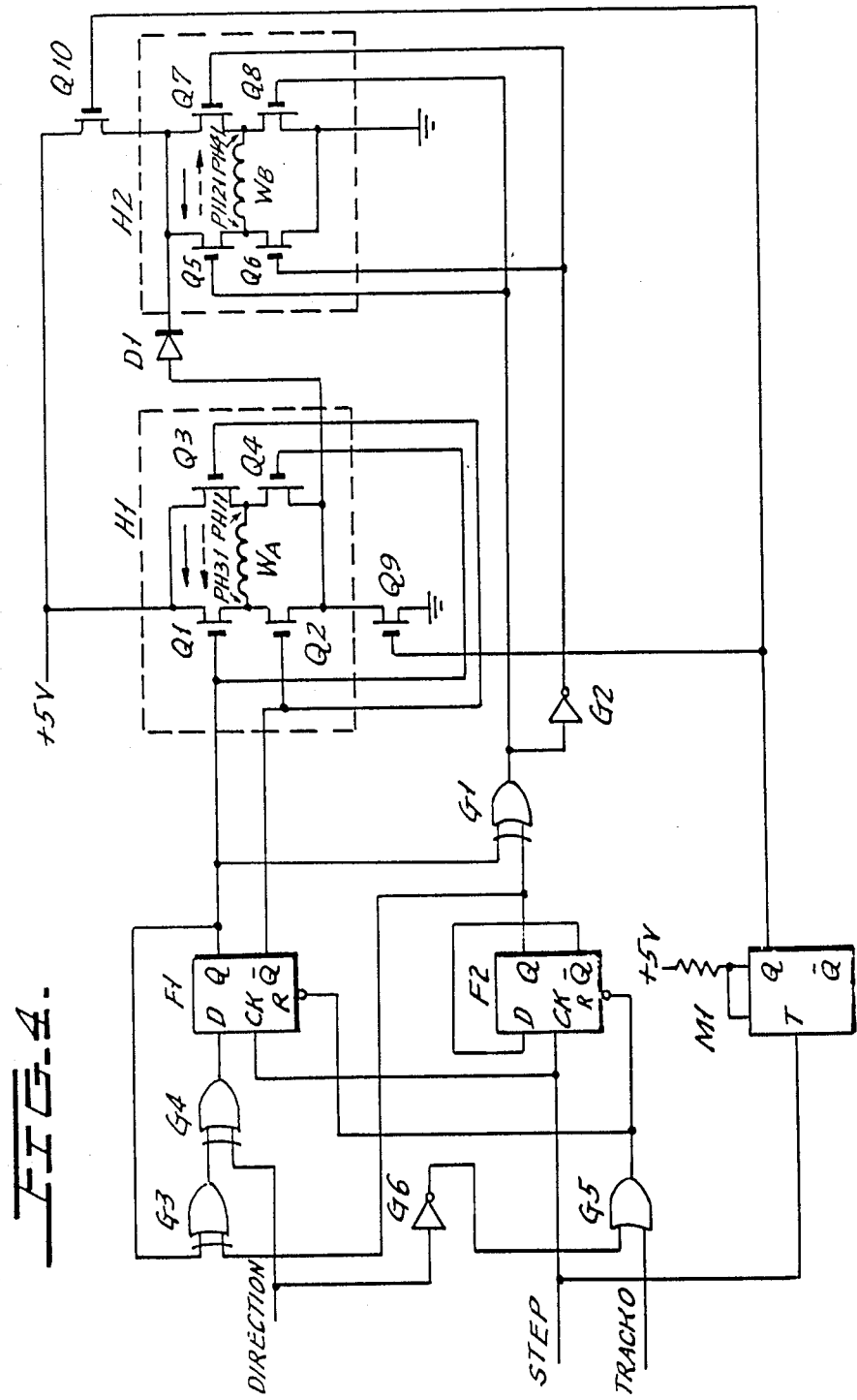
FIG. 4 is a circuit diagram of a driver for a stepping motor according to an embodiment of the present invention.

With reference to FIG. 4, according to the present invention, a first H-bridge H1, which is composed of a winding $W_A$ and MOS transistors $Q_1$ to $Q_4$, and a second H-bridge H2, which is composed of a winding $W_B$ and MOS transistors $Q_5$ to $Q_8$, are connected with each other through a diode $D_1$. The two windings are connected in series or in parallel by controlling MOS transistors $Q_9$ and $Q_{10}$. The MOS transistors $Q_1$ to $Q_{10}$ act as switching transistors. The MOS transistors $Q_1$ to $Q_{10}$ are controlled by a DIRECTION signal for determining the seeking direction of the magnetic head, a STEP signal for determining the seeking distance, and a TRACK 0 signal indicating that the magnetic head is positioned at the outermost circumference, to switch between the series and parallel connection of the windings $W_A$ and $W_B$ and the directions of the currents flowing through the individual windings. The DIRECTION signal and the STEP signal are interface signals of the floppy disk device and are fed from a host. The DIRECTION signal instructs the radially inward feed (seek) (i.e., to the center of the disk) at its "L" level and the radially outward feed (see) (in the opposite direction to the former) at its "H" level. The STEP signal instructs the seeking operation at its rising edge. The TRACK 0 signal indicates the outermost circumference at its "L" level. The transistors $Q_1$ to $Q_{10}$ are NMOS transistors which are turned on when their gate voltages are at the "H" level.

The operation controls of the transistors $Q_1$ to $Q_{10}$ is controlled by exclusive OR gates $G_1$, $G_3$ and $G_4$, an OR gate $G_5$, inverters $G_2$ and $G_6$, flip-flops $F_1$ and $F_2$, and a monostable multivibrator $M_1$. The flip-flops $F_1$ and $F_2$ are D-type flip-flops, each of which transfers an input to its D terminal through to Q terminal in response to the detection of the rise of an input to its CK terminal and is reset when the TRACK 0 signal is received by its R terminal. The monostable multivibrator $M_1$ is triggered by the rise of an input at its T terminal to generate a pulse having a width of 16 msecs.

Figure 5:
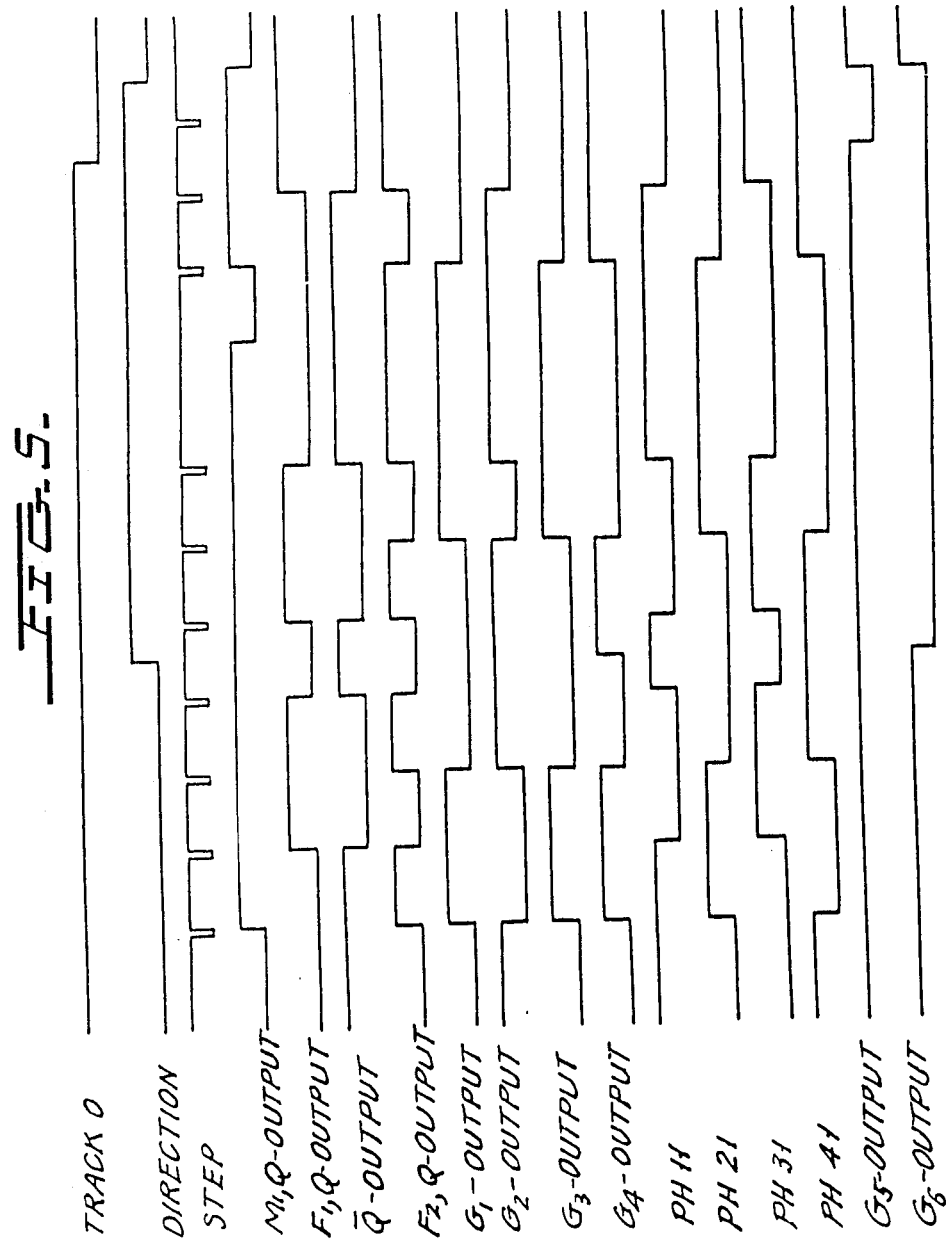
FIG. 5 is a time chart for explaining the operation of the circuit shown in FIG. 4.
Figures 6, 7:
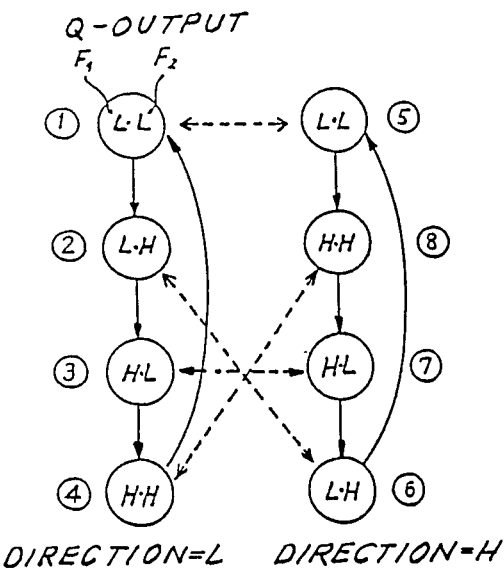
FIG. 6 is a diagram showing the state transitions of the individual Q outputs of the flip-flops $F_1$ and $F_2$ of FIG. 4 in response to a STEP signal.
FIG. 7 is a diagram showing the relationships among truth values of the individual signals of FIG. 4.

The operation of the circuit of FIG. 4 will be understood with reference to the timing chart in FIG. 5, the state transition diagram of the flip-flops $F_1$ and $F_2$ in FIG. 6, and the level relationship diagram (truth value table) of the signals of the individual portions in FIG. 7.

In FIG. 6, solid lines indicate the transitions when the STEP signal is received, and broken lines indicate the transitions when the DIRECTION signal is varied.

First of all, the circuit operations will be described in case the magnetic head is caused to seek the radially inward position (that is, in case the DIRECTION signal is at the level "L"). Now, it is assumed that the Q outputs of the flip-flops $F_1$ and $F_2$ are at the level "L" and that the Q output of the monostable multivibrator $M_1$ is at the level "L".

In this state, the transistors $Q_1$ and $Q_4$ are "OFF", whereas the transistors $Q_2$ and $Q_3$ are "ON". Since the output of the gate $G_1$ is at "L" whereas the output of the inverter $G_2$ is at "H", the transistors $Q_5$ and $Q_8$ are "OFF", whereas the transistors $Q_6$ and $Q_7$ are "ON". As a result, the nodes PH11 and PH41 take the "H" level whereas the nodes PH21 and PH31 take the "L" level so that the currents flow through the windings $W_A$ and $W_B$ in the directions, as indicated by solid lines, respectively. Since, moreover, the transistors $Q_9$ and $Q_{10}$ are "OFF", the windings $W_A$ and $W_B$ are connected in series so that the magnetizing currents flowing through the windings will take the passage: the +5V power supply →the transistor $Q_3$→the winding $W_A$→the transistor $Q_2$→the diode $D_1$→the transistor $Q_7$→the winding $W_B$→the transistor $Q_6$→the ground GND.

Now, if the first STEP signal is inputted, the Q output of the flip-flop $F_1$ takes the "L" level whereas the Q output of the flip-flop $F_2$ takes the "H" level so that the transistors $Q_1$ and $Q_4$ turned "OFF" whereas the transistors $Q_2$ and $Q_3$ are turned "ON". Then, the output of the gate $G_1$ takes the "H" level whereas the output of the gate $G_2$ takes the "L" level so that the transistors $Q_5$ and $Q_8$ are turned "ON" whereas the transistors $Q_6$ and $Q_7$ are turned "OFF". As a result, the magnetizing currents flow through the windings $W_A$ and $W_B$ in the directions, as indicated by broken lines, so that the stepping motor is caused to seek by one step by the change of the magnetic field directions. At the instant when the STEP signal is inputted, the monostable multivibrator $M_1$ is triggered to have the "H" level at its Q output so that the transistors $Q_9$ and $Q_{10}$ are turned "ON" to connect the windings $W_A$ and $W_B$ in parallel. In the H-bridge H1, the current passage at this time is: the +5V power supply →the transistor $Q_3$→the winding $W_A$→the transistor $Q_2$→the transistor $Q_9$→the ground GND. In the H-bridge H2, the current passage is: the +5V power supply →the transistor $Q_{10}$→the transistor $Q_5$→the winding $W_B$→the transistor $Q_8$→the ground GND.

Next, when the second STEP signal is inputted, the Q terminal outputs of the flip-flops $F_1$ and $F_2$ vary with the magnetizing conditions, as shown in FIG. 6. In FIG. 6, the encircled states indicate the Q outputs of the flip-flops $F_1$ and $F_2$. For example, the lefthand upper state ①:"LL" indicates that both the Q outputs of the flip-flops $F_1$ and $F_2$ are at the "L" level. If one STEP signal is inputted, the state is transited to a next state ②: "LH" (in which the Q output of the $F_1$ is at "L" whereas the Q output of the $F_2$ is at "H"), as indicated by the solid arrow. Thus, the solid lines indicate the directions of transitions in response to the input of the STEP signal. The transitions indicated at the lefthand side of FIG. 6 correspond to the case in which the direction signal is at "L", whereas the transitions in the case of the direction signal at the "H" level are indicated at the righthand side. The state transitions in case the direction signal is varied in a certain state are indicated by the broken arrows.

FIG. 7 shows the level relationships among the levels of the DIRECTION signal (as denoted at D), the Q outputs of the flip-flops $F_1$ and $F_2$, the outputs of the gates $G_1$, $G_3$ and $G_4$ and the inverter $G_2$ and the four nodes PH11, PH21, PH31 and PH41 of the windings $W_A$ and $W_B$. The ①states ⑤ of FIG. 7 are identical to the states ① and ⑤ of FIG. 6. Thus, the levels at the nodes PH11 to PH41 are varied in response to the DIRECTION signal and the STEP signal to regulate the directions of the currents flowing through the windings. In response to the input of the aforementioned second STEP signal, the stepping motor is caused to seek by another step in the radial direction. In response to the STEP signal input, as shown in FIG. 7, the state changes so that the directions of the currents flowing through the windings $W_A$ and $W_B$ are controlled to perform the seeking operation of the stepping motor.

When the magnetic head is caused to seek continuously, a next STEP signal is inputted at an interval of 3 msecs, for example. The Q output of the monostable multivibrator $M_1$ is held at the "H" level to leave the transistors $Q_9$ and $Q_{10}$ "ON" so that the currents will continuously flow in parallel through the windings $W_A$ and $W_B$. When the fourth STEP signal is inputted, the Q outputs of the flip-flops $F_1$ and $F_2$ are returned to "L" level (i.e., to the state ① of FIGS. 6 and 7). This sequence is repeated on and on.

In case the magnetic head is to be moved radially outward, the state transition indicated at the righthand side of FIG. 6 is caused in response to the STEP signal input so that the currents specified in the potentials at the two nodes of the windings, as indicated at the states ⑤ to ⑧, will flow through the winding $W_A$ and $W_B$. When the magnetic head is caused to seek to the outermost circumference, the TRACK 0 signal takes the "L" level so that the outputs of the inverter $G_6$ and the OR gate $G_5$ take the "L" level. As a result, the flip-flops $F_1$ and $F_2$ are reset. Even in response to the STEP signal in this state, the flip-flops $F_1$ and $F_2$ are unvaried.

The operating sequence thus far described is apparent from the timing chart of FIG. 5.

In case the present invention is applied to a floppy disk apparatus, it is advantageous for the purpose of size reduction to employ a linear motor as the stepping motor.

What is claimed is:

1. A driver for a stepping motor, comprising:
    a first circuit including: first and second switching devices having first ends which are connected to one end of a first winding of said stepping motor, and third and fourth switching devices having first ends which are connected to another end of said first winding,
    said first and third switching devices having second ends which are connected together, and said second and fourth switching devices having second ends which are connected together;
    a second circuit including: fifth and sixth switching devices having first ends which are connected to one end of a second winding of said stepping motor which is associated with said first winding for energizing said stepping motor, and seventh and eighth switching devices having first ends which are connected to another end of said second winding,
    said fifth and seventh switching devices having second ends which are connected together, and said sixth and eighth switching devices having second ends which are connected together;
    a diode connected between the second ends of said fourth and fifth switching devices;
    a ninth switching device connected between the second end of said fourth switching device and a reference potential;
    a tenth switching device connected between a power supply and the second end of said fifth switching device;
    a first control circuit for generating a first control signal to turn on or off said first to eighth switching devices and thereby selectively control the directions of the currents flowing through said first and second windings; and
    a second control circuit for generating a second control signal to turn on or off said ninth and tenths switching devices and thereby selectively connect said first and second windings in series or in parallel.

2. A driver according to claim 1, wherein said first to tenth switching devices comprise MOS transistors.

3. A driver according to claim 1, wherein said first control circuit includes means for generating said first control signal in response to a DIRECTION signal instructing a seeking direction of said stepping motor, a STEP signal instructing a seeking operation of making one step, and a TRACK 0 signal indicating a limit of movement of said stepping motor.

4. A driver according to claim 1, wherein said second control circuit includes means for generating said second control signal in response to a STEP signal instructing a seeking operation of making one step of said stepping motor.

5. A driver according to claim 3, wherein said first control circuit includes:
    a first exclusive OR circuit which receives said DIRECTION signal as one input;
    a first inverter for inverting said DIRECTION signal;
    an OR circuit which receives the output signal of said first inverter and said TRACK 0 signal;
    a first flip-flop which receives the output of said first exclusive OR circuit at its D terminal and supplies said D terminal input at its Q output to said first and fourth switching devices in response to said STEP signal, and supplies the inverted signal of said Q output as its Q output to said second and third switching devices, and has a reset input which is connected to said OR circuit such that said first flip-flop is reset by the output of said OR circuit;
    a second exclusive OR circuit which receives the Q output of said first flip-flop as one input and supplies the output of said second exclusive OR circuit as another input of said first exclusive OR circuit;
    a second flip-flop which has its Q output and D terminals connected with each other and which outputs the input which is applied to said D terminal as its Q output in response to said STEP signal, and has a reset input which is connected to said OR circuit such that said second flip-flop is reset by the output of said OR circuit;
    a third exclusive OR circuit which receives the Q outputs of said first and second flip-flops and supplies the output of said third exclusive OR circuit to said fifth and eighth switching devices; and a second inverter for inverting the output of said third exclusive OR circuit to supply its inverted output to said sixth and seventh switching devices.

6. A driver according to claim 3, wherein said second control circuit comprises a monostable multivibrator which supplies output pulses having a predetermined length to said ninth and tenth switching devices in response to said STEP signal.

7. A driver for a stepping motor, comprising:
first and second windings for two-phase energization of said stepping motor;
a control circuit for generating a first control signal when said stepping motor seeks and a second control signal when said stepping motor is held (or halted);
a connection switching circuit for connecting said first and second windings in parallel with a power supply in response to said first control signal and in series with said power supply in response to said second control signal; and
a current control circuit for controlling the directions of the currents flowing through said first and second windings.

8. A driver according to claim 5, wherein the Q output of said second flip-flop is supplied as a second input of said second exclusive OR circuit.

9. A driver according to claim 4, wherein said second control circuit comprises a monostable multivibrator which supplies output pulses having a predetermined length to said ninth and tenth switching devices in response to said STEP signal.

* * * * *